3,465,013
PROCESS FOR THE PURIFICATION AND RECOVERY OF COBALT SALT OF ALIPHATIC MONOCARBOXYLIC ACID OF 2–4 CARBON ATOMS
Yataro Ichikawa, Gentaro Yamashita, and Kazumi Iwata, Iwakuni-shi, Japan, assignors to Teijin Limited, Osaka, Japan, a corporation of Japan
No Drawing. Filed Feb. 27, 1967, Ser. No. 619,054
Claims priority, application Japan, Mar. 4, 1966, 41/13,497
Int. Cl. C07c 51/42; C07f 15/06
U.S. Cl. 260—439                                7 Claims

ABSTRACT OF THE DISCLOSURE

A process for the purification and recovery of a cobaltous salt of an aliphatic monocarboxylic acid from the reaction liquid obtained by the oxidation process of a dialkylbenzene with molecular oxygen in a monocarboxylic acid in the presence of a cobalt salt of an aliphatic monocarboxylic acid, which comprises reducing the cobalt salt contained in said reaction liquid to convert it to the corresponding cobaltous salt, and if necessary, before, after or simultaneously with said reduction, subjecting said reaction liquid to concentration and/or dehydration treatment to meet the following conditions:
(a) that the ratio of cobalt atom to the monocarboxylic acid in the filtrate should be within the range of one atom of the former to 5–150 mols of the latter, and
(b) that the water content of the filtrate should be no more than 1.5 mols per atom of cobalt.

---

This invention relates to a process for the purification of cobalt salt of aliphatic monocarboxylic acid of 2–4 carbon atoms to recover said cobalt salt of the carboxylic acid having a high purity with high yield.

As a process for the preparation of aromatic carboxylic acid, particularly terephthalic acid, the oxidation alkylbenzenes or its intermediate oxidation products with molecular oxygen in liquid phase has been of much industrial concern and many studies have been made on that process.

Recently a process for the preparation of aromatic carboxylic acids such as terephthalic, isophthalic and benzoic acid has been proposed in which alkylbenzenes are oxidized with molecular oxygen in a lower aliphatic monocarboxylic acid of 2–4 carbon atoms as the solvent, employing a cobaltic compound as the catalyst under relatively mild conditions such as the reaction temperature of not higher than 150° C.

As specific examples of such a process, that of performing the reaction in the presence of methylene ketone such as methyl ethyl ketone is proposed by U.S. Patents Nos. 2,853,514 and 3,036,122; that of using ozone ($O_3$) as the initiator is proposed by U.S. Patent No. 2,992,271; that of performing the reaction with addition of an aldehyde such as acetaldehyde is proposed by U.S. Patent No. 2,673,217, or with addition of an ether such as diisopropyl ether as disclosed in British Patent No. 961,474; or in the presence of a large quantity of cobalt salt as we previously proposed in the pending application Ser. No. 355,627, now Patent No. 3,334,135, issued Aug. 1, 1967 may be named.

In the conventional oxidation process employing such high temperatures as around 200° C., normal stainless steel cannot be used as the construction material for the reactor due to the highly corrosive nature of the lower aliphatic monocarboxylic acid used as the solvent, and accordingly costly construction materials such as titanium or Hastelloy C must be employed. Whereas, the oxidation process under relatively mild conditions such as the reaction temperature of not higher than 150° C. has an advantage in that wherein the use of stainless steel for the reactor is possible as the corrosive activity of the lower aliphatic monocarboxylic acid is lowered. However, when a stainless steel reactor is employed in practice, the corrosion by the lower aliphatic monocarboxylic acid does take place although at a very slow rate. This corrosion is not so appreciable as will cause strength degradation and therefore offers no substantial difficulty to the function of stainless steel as the reactor construction material. However the components of the stainless steel such as iron, nickel, chromium, manganese, molybdenum, etc. are eluted as the corrosion progresses, and during recycling use of the lower aliphatic monocarboxylic acid and cobalt catalyst, gradually thus eluted, contaminating metals are stored therein.

According to our studies, although those eluted metals are known as good air oxidation catalyst in liquid phase, with the storage of those metals during the preparation of aromatic carboxylic acid by liquid phase oxidation of alkylbenzenes with molecular oxygen or molecular oxygen-containing gas in the presence of cobaltic compounds under relatively mild conditions as aforedescribed, the yield of the aromatic carboxylic acids is lowered. Furthermore, those trace amounts of metallic impurities are the cause of undesirable coloration of the polymer and other products from the said aromatic carboxylic acids. For these reasons, removal of those metals is important.

Accordingly, therefore, the present invention relates to a process for recovering high purity cobalt while keeping the mixing thereinto of the said eluted metals (contaminating metals) to the minimum level possible, from the reaction filtrate (hereinafter to be referred to as the oxidation filtrate) obtained by the steps of oxidizing dialkylbenzenes with molecular oxygen-containing gas in liquid phase using the cobaltic compounds as the catalyst as above described and separating from the resultant reaction mixture the aromatic carboxylic acid formed.

The cobalt compound to be added as a catalyst according to this invention is used in a form such that it forms a salt with the said carboxylic acid used as a solvent. Namely, it is used in the form of cobalt metal, its oxide, hydroxide or carbonate, or as the salt of an aliphatic monocarboxylic acid having 2–4 carbon atoms. Such catalysts may be added to the reaction system as cobalt metal or any divalent or trivalent cobalt compound. During the proceeding of the reaction, at least a portion of the catalyst is converted into a trivalent cobalt salt of an aliphatic monocarboxylic acid having 2–4 carbon atoms, and exhibits a catalytic action. In this invention, a cobalt compound in such a state will be hereinafter called merely cobaltic compound or cobaltic salt.

According to the invention, it is found that when the oxidation filtrate is treated so as to make its water content no more than 1.5 mols per atom of cobalt and its aliphatic monocarboxylic acid content no more than 150 mols per atom of cobalt, and also before, after or simultaneously with that treatment the cobaltic compounds are reduced to cobaltous compounds, most of the cobaltous salts of the carboxylic acid is precipitated while most of the other contaminating metals remain dissolved in the filtrate, and that from so treated filtrate high purity cobalt carboxylate can be easily recovered in the refined form by such means as filtration or centrifugation.

The said treatment for bringing the mol ratios of water and the carboxylic acid per atom of cobalt in the oxidation filtrate within the specified ranges is performed by dehydration or concentration in the known manner, or by combination of the two.

To wit, the present invention relates to a process for the purification and recovery of cobaltous salt of the carboxylic acid from the oxidation reaction liquid, to be applied at the time of recovery of the said cobalt salt of the aliphatic monocarboxylic acid of 2–4 carbon atoms from the reaction filtrate obtained by the steps of oxidizing alkybenzenes with molecular oxygen-containing gas in an aliphatic monocarboxylic acid solvent of 2–4 carbon atoms in the presence of cobaltic compounds as the catalyst and separating from the resultant reaction liquid the aromatic carboxylic acids formed, which comprises treating the filtrate to make its water content no more than 1.5 mols per atom of cobalt and its monocarboxylic acid content, within the range of 5–150 mols per atom of cobalt, and also before, after or simultaneously with the said treatment, reducing the cobaltic compounds and recovering the percipitated cobaltous salts of the carboxylic acid.

With the process of this invention as above, greater part of the cobalt salt of said carboxylic acid in the oxidation reaction filtrate, e.g., no less than 60%, can be recovered. Whereas, we found that the residue of the filtrate from which the cobalt salt of the carboxylic acid has been recovered in the foregoing manner may be further concentrated or dried and treated with water so that more of the cobalt salt of the carboxylic acid can be recovered therefrom.

The preparation process of aromatic carboxylic acids to which the present invention is applicable is not critical so far as the process is for obtaining aromatic carboxylic acids by oxidation of alkylbenzenes with molecular oxygen in liquid phase in a lower aliphatic monocarboxylic acid of 2–4 carbon atoms as the solvent using a cobaltic compound as the catalyst. For instance, it can be advantageously applied to a process wherein a methylenic ketone and aldehyde are used as additives or a process wherein ozone is incorporated in an oxidising agent. The material to be oxidised in the process is alkylbenzenes or intermediate oxidation products thereof or mixtures thereof. As such, for example p-xylene, p-tolualdehyde, p-toluic acid, p-toluic acid esters, mixtures thereof can be advantageously used.

As the medium of the oxidation reaction, lower aliphatic monocarboxylic acid of 2–4 carbon atoms is used, acetic acid being particularly preferred. The medium may be in any form such as substantially pure form, mixture or aqueous solution containing minor amount of water. The medium can be used at optional quantitative ratio to the material to be oxidized, while normal range of use is 0.5–20 parts, preferably 1–10 parts, of the medium per part of the other.

After completion of such oxidation reaction, the resultant aromatic carboxylic acids are recovered by filtration, and the remaining filtrate (oxidation filtrate) therefore consists of the lower aliphatic monocarboxylic acid of 2–4 carbon atoms used as the solvent, water side-produced of the oxidation reaction, the cobalt catalyst, intermediate oxidation products, oxidation by products and the contaminating metals eluted from the reactor. This oxidation filtrate is removed of the greater part of the water by distillation and thereafter recycled into the oxidation system with addition thereto of the material to be oxidized. As the number of recirculations thus increases, the contents of the metals in the filtrate eluted from the reactor gradually increase to adversely influence the oxidation reaction and lower the yield of the product. Among the contaminating metals such as iron, nickel, chromium, manganese an dmolybdenum, particularly chromium and manganese have objectionable effect, and according to our researches chromium content should be kept below 500 p.p.m., preferably below 150 p.p.m., in the reaction liquid and manganese content, below 1,300 p.p.m., preferably below 350 p.p.m. Also a large quantity of iron objectionably affects the reaction. For these reasons it is necessary that the contaminating metals, particularly chromium and manganese, should be removed from the oxidation filtrate without causing loss of the cobalt catalyst, before the filtrate is recycled into the oxidation system.

When the oxidation filtrate thus containing contaminating metals is treated to have the water content and the cobalt concentration adjusted to the values within the specified ranges and also subjected to the reducing treatment, most of the cobaltic salts of the carboxylic acid in the filtrate is precipitated as insoluble cobaltous salts, while the contaminating metals, particularly iron, chromium, manganese and molybdenum, remain dissolved in the filtrate. Accordingly, by simple filtration or centrifugation of such slurry, high purity cobaltous salts of the carboxylic acid can be recovered in refined form.

According to the invention, it is required that the oxidation filtrate should be treated so that its water content is made no more than 1.5 mols, preferably below 1.1 mols, per atom of cobalt, and the ratio of the lower aliphatic monocarboxylic acid of 2–4 carbon atoms to cobalt is made no more than 150 mols, preferably below 100 mols, per atom of the latter, and also that the filtrate be subjected to a reducing treatment.

The means for the dehydration to bring about the specified water content is not critical, but any known means may be employed. Normally employed means include distillation such as direct or azeotropic distillation, or addition of acid anhydride corresponding to the aliphatic monocarboxylic acid. Incidentally, the water to be removed by this step include water content present in the oxidation filtrate of all origins, such as the water formed of the oxidation reaction, water entered into the system as that of crystallization of cobalt carboxylate, as well as those entered into the system with alkybenzenes, lower aliphatic monocarboxylic acid and molecular oxygen-containing gas.

Again the concentration of the carboxylic acid is normally performed by evaporation, under either atmospheric or reduced pressure with advantage.

The dehydration and concentration of the oxidation filtrate in accordance with the invention may be carried out simultaneously or separately. Whereas, in case the ratio of the carboxylic acid to cobalt in the oxidation filtrate is already 150 mols or less per atom of the latter, further concentration is unnecessary but with only dehydration and reduction cobaltous salt of the carboxylic acid is precipitated, and which is recoverable in refined form. For example, when dialkylbenzenes are oxidized in the presence of a large quantity of cobalt salt as we previously proposed, in that oxidation filtrate the ratio of cobalt to acetic acid is already one atom of the former to 150 mols or less of the latter, and therefore after removal of water therefrom, without concentration but with reduction only cobaltous acetate is precipitated. Thus in such a case, concentration is not required.

However, it is undesirable that the ratio of cobalt to acetic acid should become one atom to 5 mols or less.

Accordingly, for the recovery of cobaltous salts in accordance with the invention, the aliphatic monocarboxylic acid solution containing cobaltic salts and the contaminating metallic components to be treated must be such that of which carboxylic acid content ranges 5–150 mols, preferably 10–100 mols, per atom of its cobalt content, at least at the precipitation stage of the cobaltous salt.

Therefore also at the time of aforesaid concentration, care should be taken to keep the carboxylic acid content within the specified range of 5–150 mols, preferably 10–100 mols, per atom of cobalt.

By following the above, cobaltous salts of aliphatic monocarboxylic acid refined to a level substantially satisfactory for use in the aforesaid oxidation reaction can be recovered.

Whereas, since the cobalt compound used in the said oxidation reaction is present at least partly in the form of cobaltic salts, with only the adjustment of water and cobalt concentrations to the specified ranges the recovery of the cobalt salt is unsatisfactory. Therefore according to the invention the cobaltic salts in the oxidation filtrate must be reduced to cobaltous salts. Because, as aforesaid the cobalt compound used as the catalyst becomes cobaltic salts of unknown structure during the reaction, which are very soluble in substantially anhydrous lower aliphatic monocarboxylic acid. Accordingly the same needs be reduced to cobaltous salts. The reduction of cobaltic salts to cobaltous salts for this purpose may be performed by any means such as hydrogenation, and treatment with reducing agent. As the reducing agent, oxidisable compounds such as aldehydes, alcohols and ketones are used. But according to our studies it was found that the reduction can be effectively achieved by simple heating of the oxidation filtrate to 80° C. or above. Thus with the simple heating of the oxidation filtrate to 80° C. or above, the liquid changes from deep green to deep reddish pink in color, and the reduction of cobaltic salts to cobaltous salts is so effected with ease and advantage.

The reduction of the oxidation filtrate is hardly appreciable below 80° C. The upper limit to the reduction temperature is not critical, but in practice the actual temperature to be employed can be determined from such factors as reaction rate, compression strength of the reactor, thermal stability of the aliphatic monocarboxylic acid and its cobalt salt and ease of handling. Normally reduction temperature ranging from the boiling point of the solution to be reduced (in case acetic acid is employed as the solvent, around 118° C.) to 300° C. is employed with advantage. The heating time for the reduction is relative to the reduction temperature. With rise in the heating temperature of the solution, the heating time should be shortened from several hours to even several seconds to achieve the desired effect.

In accordance with the invention, as so far explained, by treating the aliphatic monocarboxylic acid solution containing the said cobaltic salts and the contaminating metallic components which is obtained from oxidation reaction of alkylbenzenes, thereby (a) making the ratio of cobalt atom to the monocarboxylic acid in the solution 1:5–150 mols.
(b) making the water content of the solution no more than 1.5 mols per ton of cobalt)
(c) reducing the cobaltic salts to cobaltous salts, cobaltous salts satisfactorily refined for reuse in the aforesaid oxidation reaction can be recovered.

And, in case the oxidation filtrate obtained from the oxidation reaction has a monocarboxylic acid content greater than the above range specified in (a), i.e. more than 150 mols per atom of cobalt, the monocarboxylic acid can be decreased by concentration with such means as distillation or evaporation, and in case the water content exceeds the range specified in (b) above, again it can be appropriately adjusted with optional dehydration means such as evaporation or distillation.

However, if the oxidation filtrate to be treated for the recovery of cobaltous salts therefrom already meets the above conditions (a) and/or (b), such treatment as concentration of the carboxylic acid and/or dehydration to fit the filtrate to those conditions can be omitted.

However, since in the oxidation filtrate at least a part of the cobalt compound is present in the form of cobaltic salts, its reduction must be effected without exception.

On the other hand, when the treatments for fulfilling the above three conditions (a), (b) and (c) are required in accordance with the invention, the treatments:

(a) concentration of the carboxylic acid,
(b) dehydration and
(c) reduction may be performed in optional order. The sole determinant of specific order is ease of handling and the will of the operator.

Again since in this invention the reduction of (c) above is achieved by simply heating the solution to 80° C. or above, or to above its boiling point, when the treatment (a) and/or (b) is performed at above 80° C., preferably above boiling point of the solution, the treatment (c) can be achieved simultaneously with (a) and/or (b). Whereas, if (a) and/or (b) is performed at below 80° C., for example, under reduced pressure, (c) must be performed separately. It is again possible to utilize a part of (a) and/or (b) treatment as a part of (c) treatment.

Specific combination of specific treatments is thus perfectly optional, bearing no significance for the essence of the invention.

The aforesaid reduction by heating is achievable in the system in which gaseous phase is optionally present. However, in case high temperature is employed, it is preferred to employ atmosphere of inert gas such as of nitrogen or hydrogen in order to lessen the loss of aliphatic monocarboxylic acid. As the apparatus for the reduction, any type may be used, while continuous or batch type agitation tank, multi-stage agitation tank and tubular reactor etc. are normally used with advantage.

The separation of the cobaltous salts of carboxylic acid precipitated in accordance with the present invention may be done after completion of dehydration, concentration and reduction treatments. However, when the cobalt concentration is higher than a certain level, considerable amount of cobaltous carboxylate is precipitated with dehydration and reduction treatments only, and therefore it is likewise possible to first separate the precipitate and thereafter to concentrate the remaining filtrate to recover the cobaltous carboxylate further precipitated.

Any construction material can be used for the dehydration, concentration and reduction apparatus so far as it is resistant to corrosion. Use of stainless steel such as U.S. stainless steel standard AISI 316 and AISI 316L or Japanese standard SUS 35 and 36, or Hastelloy, titanium or titanium alloy, glass lining, etc. is appropriate. Particularly when the reduction is effected at high temperatures, use of Hastelloy, titanium or titanium alloy, glass lining, etc. is required.

Thus with the dehydration, concentration and reduction treatmets of the oxidation filtrate, about 50–98% of cobaltous salt of the carboxylic acid is recovered in refined form. Furthermore, normally the residue after the recovery of said cobaltous salt still contain minor amounts of the cobaltous salt, it may then be further concentrated or dried and treated with water to recover the remaining salt. To wit, most of the said remaining cobalt salt is water-soluble while most of the contaminating metals are insoluble, and therefore by filtration or centrifugation high purity cobalt salt can be recovered in aqueous solution with high yield.

When the lower aliphatic monocarboxylic acid concentration of the liquid after the above aqueous treatment is as high as 10% or above, greatest parts of nickel and manganese become soluble therein, and when it reaches 40% or above, most of the iron, chromium and molybdenum become soluble.

Accordingly, the extent of the evaporation or drying must be determined depending on the amount of the water used, to make the concentration of the remaining solvent less than 10%.

While of course it is possible to evaporate and dry the residue until almost no solvent remains therein, allowing recovery of very high purity cobalt salt of the carboxylic acid by the following aqueous treatment. However when such almost perfect drying is intended, both the drying and the following aqueous treatments become difficult to perform. Thus the extent of the evaporation or drying is preferably determined for the easy operation of the drying and the aqueous treatment, within the range to make the lower aliphatic monocarboxylic acid concentration in the aqueous solution after the aqueous treatment below 10%.

Use of too much water in the aqueous treatment causes low concentration of the cobalt salt of the carboxylic acid in the resultant aqueous solution, which in turn makes the recovery of the cobalt salt from the solution expensive. In that case solubility of the contaminating metals also increases to lower the purity of the cobalt salt. On the other hand, if the water is too little, not only the dissolving operation of the cobalt salt becomes difficult but also the dissolving is insufficient to lower the recovery ratio thereof. Therefore the appropriate amount of water ranges, by weight, 0.5–20 times the solid, preferably 1–10 times. The water used for this purpose need not be new each time, but repetitive use is allowable.

In the said evaporation or drying, remaining of certain amount of the aliphatic monocarboxylic acid solvent cannot be avoided, but if the concentration of such remaining solvent at the time of the aqueous treatment exceeds 10%, the contaminating metals are eluted with the cobalt salt of the carboxylic acid. Such is objectionable for the purpose of this invention.

Normally the concentration or drying is performed under atmospheric or reduced pressure evaporation. In case of drying, care should be taken for the evaporation or sublimation of the intermediate oxidation products contained in the system.

The aqueous treatment is effected either at room temperature or elevated temperatures. The heating may be at above 100° C. under elevated pressure, if so desired. The heating time is preferably in the order of 1–60 minutes.

While the aqueous treatment may be effected in the air or inert gas, it is particularly advantageous to effect the same with blowing-in of molecular oxygen-containing gas such as air into the system, as whereby the iron is precipitated as brown, insoluble ferric compound. Again, when the aqueous treatment is not performed with the blowing-in of molecular oxygen-containing gas, substantially the equal effect can be achieved, after completion of the aqueous treatment, by blowing molecular oxygen-containing gas into the either hot or cold system, or standing the system in the air for a substantial length of time.

For the concentration or drying, any known apparatus for the purpose may be used, for example, agitation tank capable of sufficient scraping, agitation or scraping type film evaporator, kneader, spray dryer, etc. being employable with advantage. Also the apparatus for the aqueous treatment is not critical, for example agitation tank provided with molecular oxygen-containing gas blowing-in means, multistage agitation tank, foaming column, tubular reactor etc. being used with advantage. The drying and the aqueous treatment may be performed in separate apparatus, but in case one and the same apparatus is used, batchwise operation such as first effecting the concentration-drying and thereafter treating the residue with water is feasible.

The construction material of the apparatus for the concentration-drying and the aqueous treatment may be any so far as it is corrosion resistant, stainless steel, for example, U.S. stainless steel standard AISI 316 or 316L or Japanese standard SUS 35 and 36, or Hastelloy, titanium or titanium alloy and the like being appropriately employed.

Thus obtained aqueous solution of cobaltous salt of aliphatic monocarboxylic acid of 2–4 carbon atoms can be further refined, if necessary, by removing the trace of contaminating metals remaining therein by suitable means such as, for example, ion exchange and can be recycled into the oxidation system atfer its cobalt concentration is made relatively high by such means as removal of water therefrom by evaporation, recovery of cobalt carboxylate by, for example, ion exchange, or repeated use in the aqueous treatment.

The residue after the elution of cobaltous salt of the carboxylic acid by the aqueous treatment consists of the contaminating metals, chiefly iron and chromium, and predominantly of the intermediate oxidation products. Accordingly, if required, useful intermediate oxidation product such as, for example when p-xylene is oxidized, p-toluic acid can be recovered from the residue. While any known method can be employed for the recovery, for example, distillation, sublimation, steam distillation and the like are advantageously applied.

The invention now will be explained in further details with reference to the working examples, in which parts are by weight unless specified otherwise.

EXAMPLE 1

A stainless steel pressure reaction column the top of which is connected with a total condenser through a reflux condenser and the bottom of which is provided with a gas inlet was charged with 32.06 parts of glacial acetic acid and 4.93 parts of cobaltous acetate tetrahydrate [$Co(OAc)_2 4H_2O$] and air was blown thereinto at the rate of 1.04 ($cm.^3/cm.^2$. sec.). While maintaining the inside pressure of the system at 20 kg./$cm.^2$ G., the system was heated by passing steam through the heating jacket of the reaction column. When the reaction temperature reached the predetermined level of 120° C., a mixture consisting of 11.75 wt. percent of p-xylene, 76.50 wt. percent of glacial acetic acid and 11.75 wt. percent of cobaltous acetate tetrahydrate was continuously fed into the column from the middle part thereof at the rate of 0.078 part per minute, and simultaneously therewith, the corresponding amount of the content of the column was continuously discharged from the bottom of the column. Thus discharged reaction product was separated into crude terephthalic acid and oxidation filtrate by centrifugation. The oxidation filtrate was removed of water by distillation, and so dehydrated bottom was added with p-xylene, acetic acid and cobaltous acetate tetrahydrate to form the mixture of the above-specified composition, and recycled into the reaction column.

After about a month's continuous running in this manner, the contents of the contaminating metals in the oxidation filtrate became as follows as analyzed with Perkins-Elmer type 303 atomic absorption spectrophotometer.

| | P.p.m. |
|---|---|
| Iron | 87 |
| Nickel | 323 |
| Chromium | 12 |
| Manganese | 15 |
| Molybdenum | 3.8 |

(Incidentally, the large quantity of the nickel as above is due to the presence of about 1000 p.p.m. of nickel in the cobaltous acetate tetrahydrate charged.) The amount of cobalt was determined by means of EDTA titration to be 3.20 wt. percent.

Four hundred (400) g. of the oxidation filtrate of the above composition was charged in a titanium shaking type autoclave of 1 litre capacity, and the void was nitrogen-substituted. When the atmosphere was confirmed to contain no more than 0.1 mol percent of oxygen, the system was heated to 200° C. and maintained at that temperature for 30 minutes. The system withdrawn from the autoclave was deep reddish pink in color whereas previously it was deep green, and therefore it was confirmed that the reduction was complete.

This reduced liquid was then placed in one-liter separating flask provided with a Widmer rectification column and rectified under atmospheric pressure. In the meantime, glacial acetic acid of the amount corresponding to that of the liquid distillate from the column was added into the flask to maintain the amount of the liquid constant. With removal of water cobaltous acetate started to precipitate. When substantially all of the water was distilled off, the distillation was terminated and the system was cooled to 20° C. In the content of the flask, the ratio of cobalt to water was 1 atom:0.45 mol, and that of cobalt to acetic acid was 1 atom:23.9 mols. The same was filtered, and as to each of the resultant solid and filtrate, their cobalt content was determined by EDTA titration method, and the contaminating metal contents, by atomic absorption spectrophotometer, with the results as in Table 1 below.

TABLE 1

|  | Cobalt (wt. percent) | Iron (p.p.m.) | Nickel (p.p.m.) | Chromium (p.p.m.) | Manganese (p.p.m.) | Molybdenum (p.p.m.) |
|---|---|---|---|---|---|---|
| Filtrate | 0.430 | 104 | 63 | 16 | 6.8 | 2.1 |
| Solid | 26.8 | 111 | 2,520 | 6.4 | 91 | 21 |

When the balance of the metals was calculated based on the above data with the results as in Table 2, it was confirmed that cobaltous acetate of 99.74% purity was obtained at the yield of 90.5%.

TABLE 2

|  | Cobalt (g.) | Iron (mg.) | Nickel (mg.) | Chromium (mg.) | Manganese (mg.) | Molybdenum (mg.) |
|---|---|---|---|---|---|---|
| Feed | 12.8 | 34.8 | 129 | 4.8 | 6.0 | 1.5 |
| Filtrate | 1.22 | 29.5 | 17.9 | 4.5 | 1.9 | 0.6 |
| Solid |  | 4.8 | 109 | 0.3 | 3.9 | 0.9 |

Thus 86.0% of iron, 94% of chromium, 33% of manganese, 40% of molybdenum and 14.1% of nickel entered into the filtrate side and removed.

Control 1.—In this case 400 g. of the oxidation filtrate used in Example 1 was dehydrated for 30 minutes in the Widmer rectification column without the preceding reduction treatment, the liquid only turned deep brownish green. Upon cooling thereof, little cobaltous acetate was precipitated, the yield of cobaltous acetate of 99.7% purity being no more than 10%.

EXAMPLES 2–7

The same oxidation filtrate used in Example 1 was reduced in the same autoclave employed in Example 1 under the below-specified conditions, and thereafter treated in the similar manner as in Example 1, with the results as Table 3 below.

provided with the Widmer rectification column used in Example 1, and subjected to reduced pressure distillation under 200 mm. Hg, the amount of the liquid being maintained constant by addition of glacial acetic acid of the amount corresponding to that of the liquid distillate. The boiling point was 79° C. Even when substantially all of the water was distilled off, the contents of the flask still remained deep green, and precipitation of no cobaltous acetate was observed. In the so dehydrated liquid, the ratios of cobalt to water and acetic acid were, respectively per one atom of cobalt, 0.46 mol and 23.5 mols. When the same was refluxed for 2 hours in the manner of Example 8, as its color gradually changed to deep reddish pink, cobalt acetate was precipitated. The system was then cooled to 20° C., filtered and similarly analyzed as in Example 1. Whereupon it was confirmed that cobaltous acetate of 99.72% purity was recovered with the yield of 90.2%. Again 94% of chromium, 87.1% of iron, 32% of manganese, 40% of molybdenum and 14.5% of nickel entered into the filtrate side and removed.

EXAMPLE 10

Four hundred (400) g. of the oxidation filtrate used in Example 1 was placed in a one-liter separable flask provided with the Widmer rectification column used in Example 1, and rectified under atmospheric pressure. In the meantime the amount of the liquid was maintained

TABLE 3

| Ex. No. | Reducing agent | Atmosphere | Initial pressure (kg./cm.² G) | Reduction temp. (° C.) | Reduction time (hr.) | Cobalt (atom): water (mol) | Cobalt (atom): acetic acid (mol) | Yield of cobalt acetate (percent) | Purity of cobalt acetate (percent) |
|---|---|---|---|---|---|---|---|---|---|
| 2 |  | N² | 0 | 150 | 0.5 | 1:0.50 | 1:22.8 | 90.8 | 99.72 |
| 3 |  | N² | 0 | 225 | 0.5 | 1:0.60 | 1:22.1 | 91.2 | 99.80 |
| 4 |  | H² | 10 | 200 | 0.5 | 1:0.35 | 1:23.8 | 87.9 | 99.75 |
| 5 |  | H² | 10 | 150 | 0.5 | 1:0.63 | 1:22.5 | 90.6 | 99.76 |
| 6 |  | H² | 10 | 70 | 0.5 | 1:0.50 | 1:22.3 | 82.3 | 99.81 |
| 7 | Ethanol |  | 0 | B.P. | 3 | 1:0.52 | 1:22.5 | 90.3 | 99.77 |

In all cases more than 90% of chromium, more than 80% of iron, more than 30% of manganese and molybdenum and more than 10% of nickel entered into the filtrate side and removed.

EXAMPLE 8

Four hundred (400) g. of the oxidation filtrate used in Example 1 was placed in a one-liter separable flask provided with Dimroth reflux condenser, and the void of the flask was nitrogen-substituted. After 2 hours of heating under reflux, the liquid completely changed its color to deep reddish pink. Treating the reduction liquid in the similar manner as in Example 1, cobaltous acetate of 99.74% purity was recovered with the yield of 87.8%.

In the reduced and dehydrated liquid, the ratio of cobalt to water and that of cobalt to acetic acid were, respectively, 0.57 mol and 24.2 mols per atom of cobalt. And, 96.1% of chromium, 91.9% of iron, 32.4% of manganese, 41.2% of molybdenum and 16.4% of nickel entered into the filtrate.

EXAMPLE 9

Four hundred (400) g. of the oxidation filtrate used in Example 1 was placed in a one-liter separable flask constant by addition of glacial acetic acid of the amount corresponding to that of the liquid distillate. The rate of distillation was made ¼ that of Control 1, and substantially all of the water content was distilled off within about 2 hours. The contents of the flask, in which the ratios of cobalt to water and acetic acid were, per one atom of cobalt, respectively 0.51 mol and 24.1 mols, were treated as in Example 1 to yield cobaltous acetate of 99.69% purity at the recovery ratio of 89.9%. The water content of the filtrate was 0.59%. Also 95% of chromium, 87.3% of iron, 31% of manganese, 42% of molybdenum and 13.8% of nickel entered into the filtrate side and removed.

EXAMPLE 11

In the filtrate of Example 1 from which the cobaltous acetate precipitated by dehydration and reduction of the oxidation filtrate was removed by filtration, 9.5% of cobalt still remained as dissolved. With the aim to further recover the cobalt from the filtrate, the same was placed in a separating flask and subjected to simple distillation under atmospheric pressure until 90% of the charged liquid was distilled off. After cooling, the system was filtered, and the heavy metal contents of the solid and the filtrate were determined with the results as in Table 4.

The ratio of cobalt to acetic acid in the concentrated liquid was one atom of cobalt to 9.3 mols of the latter.

TABLE 4

|  | Cobalt (g.) | Iron (mg.) | Nickel (mg.) | Chromium (mg.) | Manganese (mg.) | Molybdenum (mg.) |
|---|---|---|---|---|---|---|
| Filtrate | 0.60 | 26.2 | 12.2 | 4.0 | 1.3 | 0.4 |
| Solid | 0.62 | 3.2 | 5.6 | 0.5 | 0.6 | 0.2 |
| Distribution ratio to filtrate side (percent) | 49 | 89 | 69 | 89 | 68 | 67 |

The total yield of cobalt of the dehydration-filtration and concentration-filtration was 95.2%. On the other hand, 77% of iron, 10% of nickel, 84% of chromium, 22% of manganese and 27% of molybdenum were removed. Furthermore, the cobaltous acetate recovered in this example contained 5.95% of intermediate oxidation products composed chiefly of p-toluic acid.

EXAMPLE 12

Five hundred (500) g. of the oxidation filtrate used in Example 1 was charged in a one-liter separable flask and refluxed for 2 hours under atmospheric pressure. After the cobaltic salts were so reduced to cobaltous salt, the Widmer rectification column employed in Example 1 was applied to the system to remove water from the latter by atmospheric distillation, maintaining the amount of the liquid constant by addition of glacial acetic acid of the amount corresponding to that of the liquid distilled off from the top of the column. When substantially all of the water was distilled off, the Widmer rectification column was removed and acetic acid was distilled off by simple evaporation. At each time when each predetermined amount of acetic acid was distilled off at which the cobalt (atom)-acetic acid (mol) ratio in the liquid became as indicated in Table 5, the distillation was stopped and the content of the flask was filtered after cooling to room temperature.

Each of the solid and filtrate were analyzed as in Example 1 and from the balance of the metals distribution ratio of cobalt into solid phase side and that of the contaminating metals into the filtrate side were calculated with the results as in Table 5.

TABLE 5

| Ex. No. | Cobalt: (atom) water (mol) | Cobalt: (atom) acetic acid (mol) | Distribution ratio of cobalt into solid phase side (percent) | Distribution ratios of contaminating metals into filtrate side (percent) | | | | |
|---|---|---|---|---|---|---|---|---|
|  |  |  |  | Iron | Nickel | Chromium | Manganese | Molybdenum |
| 12-1 | 1:0.17 | 1:18.3 | 93.6 | 90.4 | 8.0 | 96.2 | 48.2 | 87.3 |
| 12-2 | 1:0.06 | 1:14.4 | 96.3 | 84.4 | 5.1 | 94.8 | 40.0 | 78.6 |
| 12-3 | 1:0.07 | 1:12.7 | 96.5 | 74.8 | 4.6 | 93.8 | 37.0 | 76.4 |
| 12-4 | 1:0.04 | 1:10.0 | 97.6 | 70.0 | 3.2 | 92.4 | 31.5 | 67.0 |
| 12-5 | 1:0.02 | 1:5.5 | 98.4 | 67.8 | 2.2 | 83.0 | 23.0 | 53.1 |

EXAMPLE 13

The filtrate of the final stage obtained in Example 11, i.e., the filtrate obtained by dehydration and reduction of the oxidation filtrate, separation of the precipitated cobaltous acetate from the system by filtration, concentration of the resultant filtrate and recovery therefrom of the further precipitated cobaltous acetate by filtration, was placed in a one-liter separable flask and evaporated of the greatest portion of its volatile components. Thereafter 100 g. of water was added to the residue, and the system was heated under reflux for an hour while air was blown thereinto. Cooling and filtering the system, 75 g. of filtrate and 54.5 g. of wet residual solid which became 30.2 g. upon drying were obtained. Determining the cobalt content of each by means of EDTA titration and the metal contents, by atomic absorption spectrophotometer, balance of the metals and their distribution ratios into the filtrate side were calculated as in Table 6 below. The acetic acid concentration in the filtrate was 10 wt. percent.

TABLE 6

|  | Cobalt (g.) | Iron (mg.) | Nickel (mg.) | Chromium (mg.) | Manganese (mg.) | Molybdenum (mg.) |
|---|---|---|---|---|---|---|
| Feed | 1.35 | 37.8 | 22.4 | 5.6 | 2.4 | 0.8 |
| Filtrate | 1.05 | 0.8 | 16.6 | 0.04 | 1.8 | 0.5 |
| Residue | 0.30 | 37.2 | 5.8 | 5.6 | 0.6 | 0.3 |
| Distribution ratio into filtrate side (percent) | 78 | 2 | 74 | 0.7 | 75 | 63 |

By the series of operations of Examples 1, 11 and 13, 98.1% of cobalt was recovered, and 85.5% of iron, 92.7% of chromium and 20% of molybdenum were removed. The residue was put in a distillation apparatus and subjected to reduced pressure distillation. Whereupon 10 g. of white solid was obtained, which was found to be composed mostly of p-toluic acid which is an intermediate oxidation product, when the same was esterified with diazomethane and analyzed by means of gas chromatography.

Control 2.—Five hundred (500) g. of the same oxidation filtrate used in Example 1 was dehydrated-reduced and concentrated, removed of the precipitated cobaltous acetate and the resultant filtrate was put in a one-liter separable flask in the manner of Example 1 and Example 11, and from the system acetic acid was evaporated.

At the point when still a minor amount of acetic acid remained in the system the evaporation was stopped, and after addition of 100 g. of water the system was heated under reflux for an hour while air was blown thereinto. The following treatments being the same to Example 13, balance of the metals and distribution ratios into the filtrate side were calculated from quantitative analysis, with the results as in Table 7. The acetic acid concentration in the filtrate was 41 wt. percent.

TABLE 7

|  | Cobalt (g.) | Iron (mg.) | Nickel (mg.) | Chromium (mg.) | Manganese (mg.) | Molybdenum (mg.) |
|---|---|---|---|---|---|---|
| Feed | 1.33 | 37.9 | 22.3 | 5.6 | 2.4 | 0.8 |
| Filtrate | 1.19 | 30.0 | 18.2 | 4.5 | 2.0 | 0.6 |
| Residue | 0.14 | 7.7 | 4.0 | 1.0 | 0.4 | 0.2 |
| Distribution ratio into filtrate side (percent) | 90 | 80 | 82 | 82 | 83 | 75 |

Thus most of iron, nickel, chromium, magnanese and molybdenum eluted into the water together with cobalt, achieving no refining effect.

EXAMPLE 14

The filtrate obtained after separation therefrom of the cobaltous acetate precipitated by dehydration-concentration-reduction of 500 g. of the same oxidation filtrate used in Example 1 in the manner described in Example 1 was put in a one-liter separating flask, and its volatile components were completely evaporated in the manner of Example 11. Thereafter 100 g. of water was added to the system, followed by an hour's reflux without blowing-in of air. After cooling the system was filtered and as to each of the filtrate and the residue, cobalt content was determined by EDTA titration method, and other metal contents, by atomic absorption spectrophotometry. Whereupon balance of the metals in the aqueous extraction and their distribution ratios into the filtrate side were calculated as Table 8 below. In the filtrate, presence of acetic acid was hardly observable.

phase side were calculated as in Table 9. The acetic acid concentration of the liquid phase was very close to zero.

TABLE 9

|  | Cobalt (g.) | Iron (mg.) | Nickel (mg.) | Chromium (mg.) | Manganese (mg.) | Molybdenum (mg.) |
| --- | --- | --- | --- | --- | --- | --- |
| Distribution ratio into liquid phase side (percent) | 95.3 | 5.8 | 92.8 | 1.7 | 70 | 65 |

From the above, it can be understood that most of iron, chromium and molybdenum were removed.

EXAMPLE 16

A one-liter separating flask was charged with the filtrate obtained by the same dehydration-concentration-reduction as in Examples 1 and 11 of 500 g. of the oxidation filtrate used in Example 1 and filtration of separating cobaltous acetate. After evaporating volatile content almost completely, 100 g. of water was added thereto. The filtrate was fiercely stirred for 5 minutes at a temperature of 40–50° C. and thereafter let alone for 2 hours.

TABLE 8

|  | Cobalt (g.) | Iron (mg.) | Nickel (mg.) | Chromium (mg.) | Manganese (mg.) | Molybdenum (mg.) |
| --- | --- | --- | --- | --- | --- | --- |
| Feed | 1.30 | 37.3 | 22.0 | 5.5 | 2.3 | 0.7 |
| Filtrate | 1.05 | 20.5 | 16.5 | 0.04 | 1.6 | 0.4 |
| Residue | 0.25 | 16.5 | 5.5 | 5.4 | 0.7 | 0.3 |
| Distribution ratio into filtrate side (percent) | 81 | 55 | 75 | 0.7 | 70 | 57 |

Upon blowing air into thus obtained filtrate for 4 hours at room temperature, brown precipitate was formed. Removing the same by filtration, the iron content of the filtrate became 0.6 mg. Accordingly, the distribution ratio of iron into the filtrate side became 2.0%.

Then, the same was filtered. In each of the filtrate and the residue, the cobalt content by EDTA titration method and the other metal contents by atomic absorption method were determined. The balance and the distribution ratio into the filtrate side of each metal by water treatment are shown in Table 10. The concentration of acetic acid is 5.5% in the filtrate.

TABLE 10

|  | Cobalt (g.) | Iron (mg.) | Nickel (mg.) | Chromium (mg.) | Manganese (mg.) | Molybdenum (mg.) |
| --- | --- | --- | --- | --- | --- | --- |
| Feed | 1.32 | 37.6 | 22.2 | 5.5 | 2.4 | 0.8 |
| Filtrate | 1.09 | 1.1 | 17.5 | 0.55 | 1.9 | 0.36 |
| Residue | 0.23 | 36.5 | 4.7 | 4.95 | 0.5 | 0.43 |
| Distribution ratio into filtrate side (percent) | 83 | 3 | 79 | 10 | 79 | 45 |

EXAMPLE 15

Similarly to Example 12–2, the filtrate obtained after separation therefrom of the cobaltous acetate precipitated by dehydration-concentration-reduction of 500 g. of the oxidation filtrate used in Example 1 was put in a one-

EXAMPLE 17

A month's continuous running was carried out by employing the same reaction apparatus as in Example 1 under the following conditions in the same manner as in Example 1.

TABLE 11

| Ex. No. | Composition of feeding material (percent by weight) | | | | Reaction temp. (°C.) | Reaction pressure (kg./cm.² G.) | Average staying hour | Oxidizing agent |
| --- | --- | --- | --- | --- | --- | --- | --- | --- |
|  | p-Xylene | Acetic acid | Cobaltous acetate tetrahydrate | Additive |  |  |  |  |
| 17–1 | 8.8 | 85.2 | 1.7 | Methyl ethyl ketone, 4.3. | 130 | 34 | 1 | Oxygen. |
| 17–2 | 14.5 | 72.3 | 2.1 | Acetoaldehyde, 11.1. | 120 | 2.5 | 5 | Air. |
| 17–3 | 8.7 | 87.0 | 4.3 |  | 110 | (¹) | 5 | Oxygen containing 2% of ozone. |

¹ Atmospheric pressure.

liter-separating flask and evaporated of its volatile components completely. Then the remaining solid was withdrawn from the flask, pulverized and charged in an autoclave, followed by addition of 200 g. of water. The autoclave was charged with air at the initial pressure of 10 kg./cm.² G., and the system was heated under agitation at 150° C. for 30 minutes. After cooling, the content was withdrawn from the autoclave and separated into aqueous solution of cobaltous acetate and the residue by filtration, each of which was analyzed as in Example 13. Whereupon the distribution ratios of the metals into the liquid The contaminated metals in the oxidation filtrate obtained as the results were analyzed, cobalt by EDTA titration method and others by atomic absorption method. The results are shown in Table 12.

TABLE 12

| Example | Cobalt (percent) | Iron (p.p.m.) | Nickel (p.p.m.) | Chromium (p.p.m.) | Manganese (p.p.m.) | Molybdenum (p.p.m.) |
| --- | --- | --- | --- | --- | --- | --- |
| 17–1 | 0.43 | 159 | 165 | 23 | 22 | 7.5 |
| 17–2 | 0.56 | 90 | 135 | 13 | 13 | 4.0 |
| 17–3 | 1.10 | 43 | 201 | 7.1 | 8.3 | 2.1 |

A one-liter separating flask was charged with 500 g. of the filtrate having such compositions and provided with the Widmer rectification column. The filtrate was rectified under atmospheric pressure. From the column head, almost whole parts of water, and such an amount of acetic acid were distilled off that the mol ratio of cobalt to acetic acid was that shown in Table 13. More than two hours had passed for the above, so that the reduction was completely performed. After distilling off the predetermined amounts of water and acetic acid, the distillation was stopped. The contents of the flask were cooled to room temperature and filtrated. Amounts of the solid material and the filtrate were determined as in Example 1, the metal balance was calculated, and the distribution ratio into the solid phase side of cobalt and the distribution ratio into the filtrate side, of the contaminated metals were calculated. The results are shown in Table 13.

at least a part of the cobalt being trivalent and separating from the resultant reaction liquid the terephthalic acid formed, is dehydrated at a temperature not higher than 80° C. to make:
(1) the water content of the filtrate no more than 1.5 mols preferably no more than 1.1 mols, per atom of cobalt, and thereafter, simultaneously, or by optional order, is subjected to
(2) heating at the temperature ranging 80° C., preferably the boiling point of the filtrate after the said dehydration, to 300° C. to reduce said acetate to cobaltous acetate, and

TABLE 13

| Example | Cobalt: water (mol ratio) | Cobalt: acetic acid (mol ratio) | Distribution ratio into the solid phase side, of cobalt (percent) | Distribution ratio into the filtrate side, of contaminated metal (percent) | | | | |
|---|---|---|---|---|---|---|---|---|
| | | | | Iron | Nickel | Chromium | Manganese | Molybdenum |
| 17–1 | 1:0.18 | 1:20.1 | 90.8 | 91.5 | 8.0 | 96.3 | 48.1 | 85.9 |
| 17–2 | 1:0.15 | 1:19.8 | 91.0 | 90.8 | 8.1 | 96.0 | 47.9 | 85.3 |
| 17–3 | 1:0.17 | 1:18.9 | 91.2 | 90.3 | 8.0 | 95.9 | 47.8 | 85.0 |

What is claimed is:

1. A process for separation of cobalt compounds as a purified cobaltous salt of aliphatic monocarboxylic acid of 2–4 carbon atoms from other metals or metal compounds, said cobalt compounds and said metals or metal compounds being contained in the reaction filtrate obtained by the steps of oxidizing dialkylbenzenes with molecular oxygen-containing gas in an aliphatic monocarboxylic acid solvent of 2–4 carbon atoms in the presence as a catalyst of a cobalt salt of an aliphatic monocarboxylic acid having 2 to 4 carbon atoms, at least a part of the cobalt being trivalent and separating from the resultant reaction liquid the aromatic carboxylic acids formed, which comprises reducing the said cobaltic salts of the carboxylic acid in the filtrate to the corresponding cobaltous salt, and before, after or simultaneously with the reduction subjecting the filtrate to concentration and/or dehydration treatment in case the filtrate fails to meet the following conditions:
    (a) that the ratio of cobalt atom to the monocarboxylic acid in the filtrate should be within the range of one atom of the former to 5–150 mols of the latter, and
    (b) that the water content of the filtrate should be no more than 1.5 mols per atom of cobalt
to bring about the composition as specified in (a) and (b) above.

2. The process of claim 1 in which the said filtrate is subjected to concentration and/or dehydration treatment in case it fails to meet the following conditions:
    (a) that the ratio of cobalt to the monocarboxylic acid in the filtrate should be within the range of one atom of the former to 10–100 mols of the latter, and
    (b) that the water content of the filtrate should be no more than 1.1 mols per atom of cobalt to bring about the composition as specified in (a) and (b) above.

3. The process of claim 1 in which the said reduction is achieved by the treatment selected from the group consisting of hydrogenation, reducing agent treatment and heating to 80°–300° C.

4. The process of claim 1 in which the filtrate is that obtained by the steps of oxidizing p-xylene with molecular oxygen in acetic acid using as a catalyst a cobalt salt of an aliphatic monocarboxylic acid having 2 to 4 carbon atoms, at least a part of the cobalt being trivalent and separating from the resultant reaction liquid the terephthalic acid formed.

5. The process for the purification and recovery of cobaltous acetate in accordance with claim 1, in which the reaction filtrate obtained by the steps of oxidizing p-dialkylbenzenes with molecular oxygen-containing gas in acetic acid using as a catalyst a cobalt salt of an aliphatic monocarboxylic acid having 2 to 4 carbon atoms, at least a part of the cobalt being trivalent and separating from the resultant reaction liquid the terephthalic acid formed, is dehydrated at a temperature not higher than 80° C. to make:

(3) concentration to make the acetic acid content of the filtrate 5–150 mols, preferably 10–100 mols, per atom of cobalt.

6. A process for separation of cobalt compounds as a purified cobaltous salt of aliphatic monocarboxylic acid of 2–4 carbon atoms from other metals or metal compounds, said cobalt compounds and said metals or metal compounds being contained in the reaction filtrate obtained by the steps of oxidizing dialkylbenzenes with molecular oxygen-containing gas in an aliphatic monocarboxylic acid solvent in the presence as a catalyst of a cobalt salt of an aliphatic monocarboxylic acid having 2 to 4 carbon atoms, at least a part of the cobalt being trivalent and separating from the resultant reaction liquid the aromatic carboxylic acid formed, which comprises reducing the salt of the said carboxylic acid in the filtrate to the corresponding cobaltous salt, and before, after or simultaneously with the reduction subjecting the filtrate to concentration and/or dehydration treatment in case the filtrate fails to meet the following conditions:
    (a) that the ratio of cobalt atom to the monocarboxylic acid in the filtrate should be within the range of one atom of the former to 5–150 mols, preferably 10–100 mols, of the latter, and
    (b) that the water content of the filtrate should be no more than 1.5 mols per atom of cobalt
to bring about the composition as specified in (a) and (b) above, separating and recovering the thereby precipitated solid cobaltous salt of the carboxylic acid, concentrating the remaining filtrate, treating the concentrate with water and separating the solid from the resultant aqueous solution, thereby recovering the cobaltous salt of the carboxylic acid in the form of an aqueous solution.

7. The process of claim 6 for recovering the cobaltous salt of the carboxylic acid in the form of an aqueous solution, in which the treatment with water comprises:
    (1) making the carboxylic acid content of the concentrate less than 10% by weight of the aqueous solution resultant from the treatment with water, and
    (2) adding water to the concentrate to make the water content of the system 0.5 to 20 weight times, preferably 1 to 10 weight times, of the solid.

References Cited

Tappmeyer et al., Inorg. Chem., vol. 2 (1963), pp. 823–5.

Sharp, J. Chem. Soc. 1957, p. 2030.

TOBIAS E. LEVOW, Primary Examiner

A. P. DEMERS, Assistant Examiner

U.S. Cl. X.R.

260—524